E. C. OLIVER.
PULLEY.
APPLICATION FILED AUG. 9, 1919.

1,380,495.

Patented June 7, 1921.

Inventor
EDD C. OLIVER

By Charles E. Wise
Attorney

UNITED STATES PATENT OFFICE.

EDD C. OLIVER, OF ADRIAN, MICHIGAN.

PULLEY.

1,380,495.   Specification of Letters Patent.   Patented June 7, 1921.

Application filed August 9, 1919. Serial No. 316,386.

*To all whom it may concern:*

Be it known that I, EDD C. OLIVER, a citizen of the United States, residing at Adrian, county of Lenawee, State of Michigan, have invented a certain new and useful Improvement in Pulleys, and declare the following to be a full, clear, and exact description of the same, such as will enable others skilled in the art to which it pertains to make and use the same, reference being had to the accompanying drawings, which form a part of this specification.

The general object of this invention is to provide a free running pulley for cords and the like that is simple in form and inexpensive in construction. A further object of the invention is to provide a pulley in which the rotated member is mounted on ball bearings within flanged plates providing stationary guide members for the cord. The principal feature of the invention is involved in the construction utilizing a ball bearing having an inner and outer raceway and flanged plates inclosing the bearing and securely holding the inner raceway from rotation and permitting a free rotation of the outer raceway. These and other objects and the several novel features of construction embodying my invention are hereinafter more fully described and claimed and shown in the accompanying drawings in which—

Figure 1:
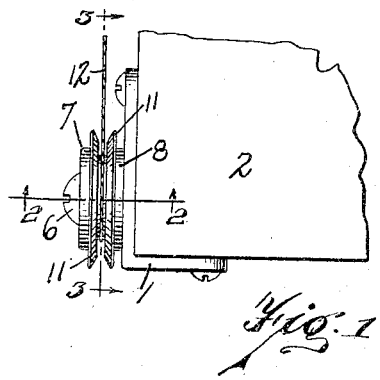
Figure 1 is an elevation showing the pulley in one of its uses.
Figure 2:
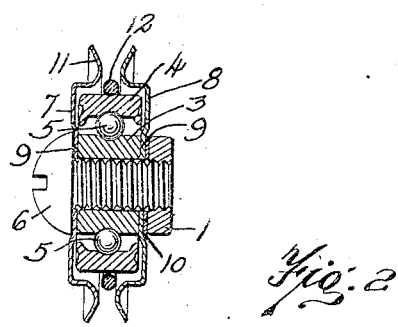
Fig. 2 is a section on an enlarged scale taken on line 2—2 of Fig. 1.
Figure 3:
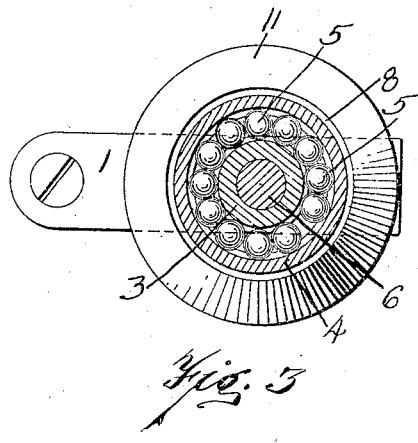
Fig. 3 is a section on an enlarged scale on line 3—3 of Fig. 1.
Figure 4:
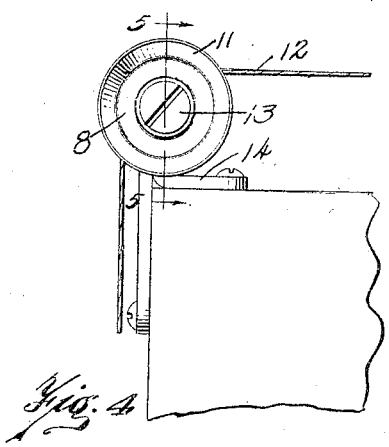
Fig. 4 is a side elevation of a pulley showing a different form of mounting.

The pulley is adapted for various uses wherever a cord or belt is to be used and is especially adaptable for work where the pulley is not subjected to any very great strains as for instance in parallel rules for draftsmen's use in which the rule is attached to the cords running about the pulleys at the corner of the drafting table. This is a well known form of construction. Fig. 1 of the drawings shows the pulley as applied to such a use, the pulley being mounted on a frame member 1 and is attached to the corner of a table 2. As shown in Fig. 2, the pulley consists of an inner ball race 3 and an outer ball race 4, both of which are curved to receive a row of balls 5 as will be understood from Fig. 5. The inner raceway is centrally apertured through which passes a screw 6 engaging in threaded relation with an arm on the bracket 1. The assembled ball races and balls are positioned as a unit within the two half cases 7 and 8 having a central depression 9 surrounding the aperture for the screw member and contacting the ends of the inner raceway 3 and a washer 10 is interposed between the bracket 1 and the plate 8 fitting the recess in the said plate whereby, on tightening the screw, pressure is applied to the recessed portions 9 of each plate binding the two plates and the central raceway together holding the same stationary. The outer raceway is freely rotatable within these half cases or plates, and the plates are inwardly bent and then outwardly flanged about the periphery of the outer ball race and spaced therefrom as shown, the outward extending flanges 11 of each of the two plates being positioned at an angle one to the other through which the cord 12 may pass onto the outer ball race.

The flanges of the plates provide guides for the cord running over the outer raceway as a pulley and the raceway being supported by the balls upon the inner raceway is very freely rotatable providing a free running pulley for a cord or a belt.

The particular feature of the invention is in the binding of the inner raceway to the plates and holding the same stationary permitting a free revolution of the outer raceway and various mountings may be devised within the spirit of this invention for securing these plates or half cases to the inner raceway.

Figure 5:
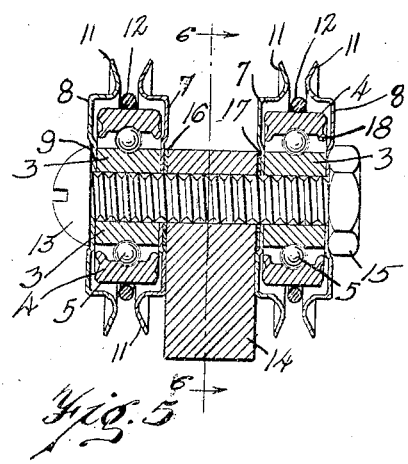
Fig. 5 is a section taken on line 5—5 of Fig. 4, showing a method of mounting the pulleys in pairs.
Figure 6:
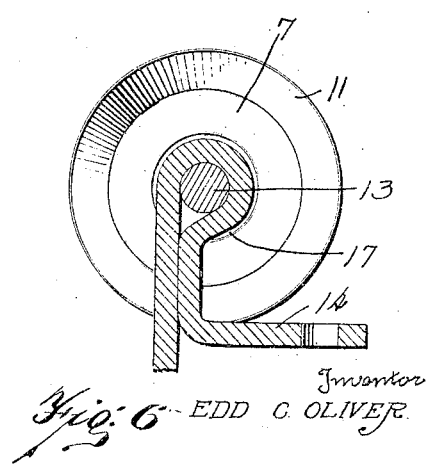
Fig. 6 is a section taken on line 6—6 of Fig. 5.

The pulleys may be mounted in bearings as is shown in Fig. 5 in which case the screw 13 passes through the central supporting standard 14 and through the inner raceways of both pulleys, a nut 15 being employed on the outer end of the screw and washers 16 and 17 being inserted between the central recesses of each inner plate of the two pulleys and the bracket 14 whereby pressure is applied by rotation of the nut 15 to hold the cases in contact with the inner raceways in the same manner as is shown in the construction of Fig. 1. By the use of a washer 16 or 17, the pulley may be mounted directly against the face of the bracket as shown more clearly in Fig. 5 in such a manner that pressure is applied to the center of the case adjacent the bracket. Without the interposition of the washer the part of the case extending about the outer raceway contacting the bracket would prevent pressure being applied to the inner end of the inner raceway. With a washer of the proper thickness so applied, the raceway is held by pressure at each end.

In any case the flanged half cases or plates are preferably held stationarily with the inner raceway, the flanges of the plates providing guides for a cord or belt and holding the same centrally on the periphery of the outer raceway and preventing the cord from creeping between the periphery of the outer raceway and the part of the plate extending thereover.

The ball races may be of any desired design necessarily of a character to hold the balls in position to prevent displacement thereof and are here shown as being formed of a single inner and a single outer member, the outer member 4 having side flanges 18 partially covering the interstice between the two raceways. Other constructions may be employed, however, if desired, without departing from the spirit of this invention.

From the foregoing description, it is evident that the pulley is adapted for various uses and is inexpensive in character and neat in design providing a pulley that is extremely free running.

Having thus briefly described my invention, its utility and mode of operation, what I claim and desire to secure by Letters Patent of the United States is—

1. A pulley comprising an inner and an outer ball race, a series of balls therebetween and a pair of circumferentially flanged plates secured in fixed relation with opposite sides of the inner ball race and extending about and spaced from the outer ball race, the plates being spaced at the periphery permitting the introduction of a cord or belt onto the outer ball race and forming a guide therefor.

2. A pulley comprising an inner and an outer ball race, a series of balls therebetween, a casing inclosing the ball race of a character to permit introduction of a cord or belt to the periphery of the outer ball race, and a supporting member for the pulley including a central binding screw extending through the inner ball race and a bracket threaded to receive the screw, the screw binding the case in fixed relation with the inner race and bracket.

3. A pulley comprising an inner and an outer ball race, a series of balls therebetween, the inner ball race being centrally apertured, a flanged plate on each side forming a case for the ball races, the plates having a central depression and being centrally apertured and having peripheral outwardly extending flanges forming a circumferential slot permitting introduction of a cord or belt onto the periphery of the other ball race, and a bolt extending through the plates and inner ball race adapted to bind the plates and ball race.

4. A pulley comprising an inner and an outer ball race, a circumferentially split casing inclosing the same of a character to engage the inner raceway and permitting free rotation of the outer raceway, and means for binding the split casing and inner raceway together as a unit.

5. A pulley comprising an inner and an outer ball race, a series of balls therebetween, a case therefor comprising two similar flanged plates spaced at the periphery, the plates being cupped in form and the flanges extending outwardly from the circumferential wall at an angle one to the other, the plates having a central aperture and a depression thereabout extending inwardly toward the flanged or cupped side, the inner ball race having a central aperture, a bolt extending through the plates and inner ball race, and a member into which the bolt is threaded, a washer in one of the said depressions adjacent the threaded member, the bolt binding the parts together and securing the plates in fixed relation with the inner race, the plates being of a shape permitting free rotation of the outer ball race, and the flanges providing a guide for a cord running on the periphery of the outer ball race.

6. A pulley comprising an inner and an outer ball race, a series of balls therebetween, a cupped plate on each side of the ball race inclosing the same and being spaced apart at the periphery providing a circumferential slot permitting the introduction of a cord to the periphery of the outer ball race, the cupped plates having a central depression and being centrally apertured, the depressions about the aperture engaging the ends of the inner ball race, a screw extending through the plates and inner ball race, and a bracket member threaded to receive the screw providing a support for the pulley, a washer between the bracket and the adjacent plate fitting the central recess thereof whereby rotation of the screw binds the plates in fixed relation with the inner ball race.

7. A pulley comprising an inner and an outer ball race, a pair of stamped sheet metal plate of cupped form, the plates having a central depression extending into the cupped portion, the plates being centrally apertured, a screw extending therethrough and through the inner ball race binding the plates and inner ball race together in fixed relation permitting free rotation of the outer ball race, said plates having circumferential flanges in spaced relation permitting free access to the outer ball race at all points of the circumference for introduction of a cord or belt.

In testimony whereof, I sign this specification.

EDD C. OLIVER.